United States Patent [19]

Chang et al.

[11] Patent Number: 5,108,723
[45] Date of Patent: Apr. 28, 1992

[54] PROCESS FOR ABSORPTION OF SULFUR COMPOUNDS FROM FLUIDS

[75] Inventors: Dane Chang, Houston; Steven H. Christiansen; David A. Wilson, both of Richwood, all of Tex.

[73] Assignee: The Dow Chemical Company, Midland, Mich.

[21] Appl. No.: 569,118

[22] Filed: Aug. 16, 1990

[51] Int. Cl.$^5$ ............................................. C01B 17/00
[52] U.S. Cl. ................................... 423/242; 423/243; 423/244; 423/540
[58] Field of Search ............... 423/220, 222, 226, 228, 423/229, 230, 231, 242 A, 243, 244 A, 540, 541 A

[56] References Cited

U.S. PATENT DOCUMENTS

| | | | |
|---|---|---|---|
| 3,856,921 | 12/1974 | Shrier et al. | 423/228 |
| 4,100,256 | 7/1978 | Bozzelli et al. | 423/220 |
| 4,112,049 | 9/1978 | Bozzelli et al. | 423/226 |
| 4,366,134 | 12/1982 | Korosy et al. | 423/243 |
| 4,387,037 | 1/1983 | Trenthan et al. | 252/184 |
| 4,465,614 | 8/1984 | Trenthan et al. | 252/364 |
| 4,469,663 | 9/1984 | Crump et al. | 423/242 |
| 4,530,704 | 7/1985 | Jones et al. | 55/48 |
| 4,767,860 | 8/1988 | Dunmore et al. | 544/384 |
| 4,783,327 | 11/1988 | Treybig | 423/243 |
| 4,814,443 | 3/1989 | Treybig | 540/492 |
| 4,820,391 | 4/1989 | Walker | 423/235 |
| 4,957,716 | 9/1990 | Cichanowicz | 423/242 |
| 4,980,471 | 12/1990 | Christiansen et al. | 544/384 |

FOREIGN PATENT DOCUMENTS 450519 1/1935 United Kingdom .

OTHER PUBLICATIONS

R. M. Genik-Sas-Berezowsky et al., Canadian Journal of Chemistry, vol. 48, pp. 163–175 (1970).
Chemical Abstract 44:5103g (1950).
U.S. application Ser. No. 546,075, filed Jun. 29, 1990, (issued as U.S. Pat. No. 5,019,365, May 28, 1991).
U.S. application Ser. No. 07/418,292, filed Oct. 6, 1989 (issued as U.S. Pat. No. 4,980,471, Dec. 25, 1990).
U.S. Application Ser. No. 07/569,120, filed Aug. 16, 1990.

*Primary Examiner*—Gary P. Straub
*Assistant Examiner*—Timothy C. Vanoy

[57] ABSTRACT

A process for removing $SO_2$ from a fluid containing $SO_2$ by employing as an absorbent for the $SO_2$ an admixture of water and a compound represented by Formula I:

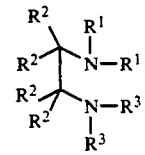

Formula I wherein each $R^1$, $R^2$ or $R^3$ is independently hydrogen; an alkyl group; a carboxylic acid group; a hydroxyalkyl group; an aldehyde group; and alkyl group containing a carboxylic ester, a carboxylic acid or salt, ether, aldehyde, ketone or sulfoxide group; wherein at least one $R^1$ or $R^3$ is carboxy methyl group and at least one $R^1$ or $R^3$ is hydrogen, preferably at least one $R^1$ is carboxy methyl and at least one $R^3$ is hydrogen. The absorbent solution preferably can be thermally regenerated by heating to remove $SO_2$.

27 Claims, No Drawings

PROCESS FOR ABSORPTION OF SULFUR COMPOUNDS FROM FLUIDS

BACKGROUND OF THE INVENTION

This invention relates to a process for removing sulfur compounds from gaseous streams. More particularly, it relates to a method for removing sulfur compounds including sulfur dioxide ($SO_2$) from fluids.

Removal of such sulfur compounds as sulfur dioxide, e.g. from fluids such as industrial and utility gas emissions, is increasingly important. Acid rain is believed to occur when sulfur dioxide in such emissions undergoes chemical changes in the atmosphere and returns to earth with precipitation.

There are numerous techniques for removing sulfur compounds from gas streams containing them. One common process employees limestone scrubbing. The disadvantage of this process is the necessity of disposing of the large volume of solid waste produced. The wastes are not generally recycled. Another system, taught in U.S. Pat. No. 4,366,134, employs potassium or sodium citrate to selectively remove $SO_2$ from a gas stream. While the wastes from this process can be recycled, recycle is expensive because thermally stable salts are formed and require higher heat for regeneration.

More recent patents teach the use of certain piperazinone derivatives. For instance, U.S. Pat. No. 4,112,049 teaches use of certain piperazinones and N,N'-alkyl piperazinone. In another patent, U.S. Pat. No. 4,530,704, the removal of $SO_2$ from a gas stream is accomplished by contacting a gas stream containing it with an aqueous solution of a piperazinone, morpholinone or N-alkyl substituted derivatives thereof, e.g. N,N'-dimethyl-2-piperazinone. In U.S. Pat. No. 4,783,327 certain hydroxyalkyl substituted piperazinones are taught for use in a similar manner.

It would be advantageous to have a process for removal of sulfur compounds such as sulfur dioxide which employs an aqueous solution and uses an absorbent which has a high capacity for absorbing sulfur dioxide. The absorbent would desirably be regenerable. It is also desirable that this absorbent has adequate water compatibility at ambient or higher temperatures and its salts ar water soluble to avoid inducing scaling or plugging of plant equipment.

SUMMARY OF THE INVENTION

The present invention is a process for removing $SO_2$ from a fluid containing $SO_2$ by employing, as an absorbent for the $SO_2$, an admixture of at least one compound represented by Formula I and water.

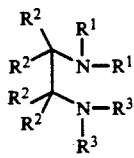

Formula I

DETAILED DESCRIPTION OF THE INVENTION

The compounds useful in admixture with water for removing $SO_2$ from fluids are compounds having an ethylene diamine structure, preferably compounds of Formula I:

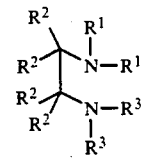

Formula I wherein each $R^1$, $R^2$ or $R^3$ is independently hydrogen: an alkyl group: a carboxylic acid group: a hydroxyalkyl group: an aldehyde group: an alkyl group containing a carboxylic ester, a carboxylic acid or salt, ether, aldehyde, ketone or sulfoxide group; wherein at least one $R^1$ or $R^3$ is carboxymethyl group ($-CR^2_2-COOH$ or $CR^2_2-COO^-X^+$, where X is a counter ion) and at least one $R^1$ or $R^3$ is hydrogen, preferably at least one $R^1$ is carboxymethyl and at least one $R^3$ is hydrogen.

In each of the possible $R^1$, $R^2$ or $R^3$ groups, each alkyl group is of a size or molecular weight suitable for use in absorbing sulfur dioxide, preferably in aqueous solution. Preferably each alkyl group, including the substituted groups such as hydroxyalkyl groups, have from 1 to about 12 carbon atoms, more preferably from 1 to about 6 carbon atoms. Each alkyl group is suitably cyclic, branched or unbranched and optionally is at least partially unsaturated (alkylene), e.g. vinyl or allyl groups or substituents.

In Formula I, each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups: carbonyl groups including those in aldehydes, esters, acids or salts, ketones: and sulfoxides.

Preferred substituents, $R^1$, $R^2$ or $R^3$ on compounds of Formula I are those which enhance solubility in water, preferably without decreasing the capacity for absorbing $SO_2$, the regenerability of the compound after absorption, or the chemical and heat stability under conditions of use. Preferred substituents are generally hydrogen: formyl groups; alkyl groups: and alkyl groups having at least one hydroxyl: carboxylic acid, ester or salt: aldehyde or ketone group: more preferably, unsubstituted alkyl groups, alkyl groups having at least one hydroxyl, carboxylic acid or salt substituent, most preferably alkyl groups having at least one hydroxyl group, that is hydroxyalkyl groups. When there are salts present the counter ion is suitably any which allows the compound to be soluble, preferably a alkali metal ion.

Exemplary of compounds of Formula I are ethylenediaminemonoacetic acid (EDMA): ethylenediaminediacetic acid (EDDA), both symmetrical (s-EDDA) and unsymmetrical (u-EDDA): ethylenediaminetriacetic acid (ED3A) 1-methyl EDDA: 1,4-dimethyl EDDA: 1-hydroxyethyl EDDA: 1-formyl EDDA: and the like. Preferred compounds include s-EDDA, u-EDDA, EDMA and ED3A, more preferred are s-EDDA and EDMA. Such compounds are commercially available or can be prepared by methods within the skill in the art such as that taught by R. M. Genik-Sas-Berezowsky et al. in *Canadian Journal of Chemistry*, 48, 163-175 (1970).

Among compounds of Formula I, preferred compounds are those which have a capacity for absorbing $SO_2$ which, in combination with the water solubility, is suitable for use in aqueous solutions for absorbing $SO_2$. The capacity for absorbing $SO_2$ is determined by saturating a solution of a known concentration of the absorbent in water with $SO_2$, e.g. by sparging $SO_2$ (preferably in a mixture simulating that found in e.g. smokestacks) into the solution. Sparging is continued until the solution has absorbed a maximum amount of $SO_2$ (saturation). Then the concentration of bisulfite (including sulfite that may be present) and bisulfate (including sulfate) ions are determined, e.g. using a standardized commercially available ion chromatograph unit. Such determinations are within the skill in the art and are exemplified in the Examples of this invention. Capacity is calculated as the mole ratio of absorbed $SO_2$ (as measured by the sum of the moles of bisulfite and bisulfate) to absorbent compound.

The capacity for absorbing $SO_2$ is considered in combination with the water solubility of the compound because the absorbing capacity of a solution is the capacity of the absorbent multiplied by the amount of absorbent present. An arbitrary parameter CS defined as:

$$CS = [Capacity\ in(moles\ SO_2/moles\ absorbent)] \times (Solubility\ in\ moles\ absorbent/liter\ at\ 23°\ C.)$$

is determined for a potential absorbent. Absorbents used in the practice of the invention preferably have a CS of at least about 0.05, more preferably at least about 0.5, most preferably at least about 0.7 moles $SO_2$/liter at 23° C.

Among compounds of Formula I solids can be used because they are conveniently transported and used. Such compounds are also of sufficiently low volatility to avoid overhead loss of the absorbent during thermal regeneration.

The compounds used in the present invention are employed in aqueous solution at a concentration of from about 0.1 weight percent in water up to about their saturation concentration in water at the temperature at which an absorber is operated. The absorbent solution, after use, is preferably thermally regenerated, e.g. by passing steam through the solution, and recycled to the absorption step. The absorber can be operated at a temperature of from about 0° to about 120° C., but is preferably operated at a temperature of from about 5° to about 75° C., most preferably at from about 5° to about 60° C.

Pressures of from about atmospheric to about 10 atmospheres can be employed, but about atmospheric pressure (e.g. 0 to 10 pounds per square inch gauge (psig) (0 to 68.95 pascals (Pa) gauge) is preferably and conveniently employed. Higher temperatures and pressures are not deleterious so long as they are below the decomposition conditions of the absorbent, but equipment design modifications may be required to allow for pressure and temperature resistance. Fluids being treated in the practice of this invention suitably contain any amount of $SO_2$, e.g. from about one ppm (parts per million) (by volume) up to about 100 volume percent, preferably from about 100 ppm to about 3000 ppm (by volume).

Thermal regeneration of the absorbent suitably takes place at any temperature below the thermal decomposition temperature of the absorbent compound, preferably at a temperature of from about 75° C. to about 150° C., most preferably from about 90° C. to about 120° C., at atmospheric pressure, reduced pressure or pressures above atmospheric are suitable, but atmospheric is convenient. Regeneration at about 100° C. at about atmospheric pressure (e.g. 0 to 10 pounds per square inch gauge (psig) (0 to 68.95 pascals (Pa)) is particularly convenient because water in the aqueous solution boils and can be refluxed while the $SO_2$ is released.

Regenerability of an absorbent is a measure of the ability of the absorbent to release $SO_2$ (so that the absorbent may be reused). Regenerability is determined by measuring the bisulfate and bisulfite concentrations in a solution of known concentration of absorbent which has been saturated with $SO_2$ as in the determination of $SO_2$ absorption capacity. This solution is referred to herein as the enriched solution. Then a portion of the enriched solution is heated to strip $SO_2$ as a gas. For purposes of the measurement, stripping is done at the boiling point of the solution, about 100° C. with $N_2$ sparge at 0.5 SCFH (Standard cubic feet per hour at 60° F.) for 4 hours. During the stripping, additional water is frequently added to make up the water loss due to evaporation. A sample of this stripped solution is analyzed for bisulfite and bisulfate concentration by the same method used to analyze the concentration of the original enriched solution. The difference in combined bisulfite and bisulfate concentrations between the stripped and enriched $SO_2$ solution is used to calculate the percent regenerability of each solution using the equation:

$$\%\ Regenerability = \left(1 - \frac{Total\ bisulfite\ plus\ bisulfate\ concentration\ in\ stripped\ solution}{Total\ bisulfite\ plus\ bisulfate\ concentration\ in\ enriched\ solution}\right) \times 100$$

Percent regenerability of absorbents used in the practice of the invention is preferably at least about 30, more preferably at least about 50, most preferably at least about 60 percent.

When compounds of Formula I are exposed to the temperatures and other conditions of such regeneration steps it is believed that the compounds form a ring "in situ" and form compounds of Formula II:

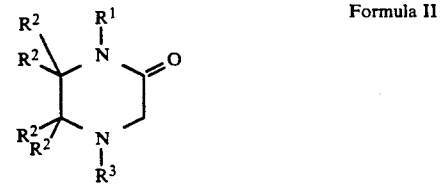

Formula II wherein each $R^1$ or $R^2$ or $R^3$ is as defined for Formula I. Thus, it appears that, at least a portion of the absorbent compounds after regeneration are compounds of Formula II rather than Formula I. Compounds of Formula II are, however, active as absorbents and are, themselves, regenerable.

When it is desired that all of the compounds of Formula I be converted to compounds of Formula II, a regeneration step of at least about 100° C. for a period of at least about an hour, preferably at least about 1.5 hours, more preferably at least about 1.75 hours is used.

During a regeneration step in which a compound of Formula I is converted to a compound of Formula II, the pH is preferably less than about 5, preferably less than about 2. More preferably sufficient $SO_2$ concentration is present to maintain such a pH. The $SO_2$ concentration is conveniently maintained by allowing a fluid containing $SO_2$ to flow through the aqueous solution containing the compound of Formula I.

The following examples illustrate the use of compounds of Formula I in the process of this invention. All percentages, ratios and parts are by weight unless otherwise indicated.

EXAMPLE 1

A total amount of 5.287 g (0.03 moles) of symmetrical ethylenediaminediacetic acid (s-EDDA) is dissolved in 200 ml (milliliters) of deionized water at room temperature (23° C.) to form a solution. A 10/90 volume percent mixture of $SO_2$ and $N_2$ (respectively) gases is sparged through a coarse (100-150 micron) gas dispersion tube into this solution at 2.0 standard cubic feet per hour, meaning cubic feet at 60° F. at atmospheric pressure passed per hour (SCFH) (equivalent to $1.57 \times 10^{-5}\, m^3/s$ at 16° C.) for 1 hour to form an $SO_2$ enriched solution. The solutions pH drops from 4.60 to 1.73. A small sample of the $SO_2$ enriched solution is analyzed for bisulfite [$HSO_3^-$] and bisulfate [$HSO_4^-$] concentration using a standardized ion chromatograph commercially available from Dionex Corporation under the trade designation Dionex ™ IC Series 4000, a column packed with AG4/AS4 resin also commercially available from Dionex Corporation, a conductivity detector commercially available from Wescant, Corp. and a Dionex anion micro membrane suppressor commercially available from Dionex Corp. under the trade designation 8080. Total concentration of bisulfite and bisulfate is 0.0188 moles.

The sum of the sulfite and bisulfate concentrations is used to calculate the $SO_2$ capacity (mole ratio of $SO_2$/absorbent compound) to be 0.63.

Then, the remaining $SO_2$ enriched solution is transferred into a flask and heated to boil on a hot plate at about 100° C. with $N_2$ sparge (0.5 SCFH) ($4 \times 10^{-6}\, m^3/s$ at 16° C.) for 1 hour to strip $SO_2$ as a gas. During the stripping, additional water is frequently added to make up the water loss due to evaporation. A sample of this stripped solution is determined to have a combined bisulfate and bisulfate concentration of 0.0069 moles by the same method used to analyze the concentration of the original enriched solution. The difference in combined bisulfite and bisulfate concentration between the stripped and original (enriched) $SO_2$ solution is used to calculate the $SO_2$ percent regenerability as 63.3 percent using the equation:

$$\% \text{ Regenerability} = \left(1 - \frac{\text{Total bisulfite plus bisulfate concentration in stripped solution}}{\text{Total bisulfite plus bisulfate concentration in enriched solution}}\right) \times 100$$

The CS is calculated, by multiplying the capacity times the concentration in moles/l, and is 0.095 moles $SO_2$/liter. Thus, s-EDDA is shown to be suitable for use as an absorbent for $SO_2$.

EXAMPLE 2

An amount of 3.5355 grams (0.02 moles) of symmetrical ethylenediaminediacetic acid (s-EDDA) is thoroughly dissolved in a flask containing 150 ml of deionized water. This solution is then sparged at 5 SCFH ($3.9 \times 10^{-5}\, m^3/s$ at 16° C.) with a 10 percent $SO_2$ in $N_2$ gas mixture for approximately 60 minutes at ambient temperature (23° C.). The pH of the solution drops from 4.6 to about 1.3 with the addition of $SO_2$.

After such $SO_2$ absorption, the solution is heated to boil at about 100° C. for 30 minutes with continuous $SO_2$ sparge to regenerate the solution. During heating, additional water is added to make up that lost to evaporation. During heating, EDDA appears to undergo cyclization resulting in the formation of EDDA lactam. The heating process is continued for one hour and 45 minutes until a $_{13}C$ NMR spectrum indicates that all EDDA had been lactamized, as indicated by loss of peaks at about 45.8, 51.1 and 172.2 ppm (parts per million from a tetramethylsilane (TMS) standard) and appearance of peaks at about 43.1, 47.1, 47.6, 53.7, 166.7 and 177.7 ppm.

The EDDA lactam recovered by evaporating the water, weighs a total of 3.1969 grams (0.0202 moles, molecular weight=158). The yield is 100 percent.

What is claimed is:

1. A process for removing $SO_2$ from a fluid containing $SO_2$ by employing as an absorbent for the $SO_2$ an admixture of water and at least one compound represented by Formula I:

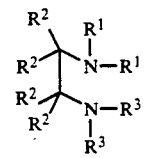

Formula I wherein each $R^1$, $R^2$ or $R^3$ is independently hydrogen; an alkyl group; a carboxylic acid group; a hydroxyalkyl group; an aldehyde group; an alkyl group containing a carboxylic ester, a carboxylic acid or salt, ether, aldehyde, ketone or sulfoxide group; wherein at least one $R^1$ or $R^3$ is carboxymethyl group [($CR^2_2$—COOH or $CR^2_2$—COO$^-X^+$)] (—$CR^2_2$—COOH or —$CR^2_2$—COO$^-X^+$) and at least one $R^1$ or $R^3$ is hydrogen.

2. The process of claim 1 wherein each alkyl group has from 1 to about 6 carbon atoms.

3. The process of claim 1 wherein at least one of $R^1$ is a carboxymethyl group and at least one of $R^3$ is a hydrogen group.

4. The process of claim 3 wherein each $R^2$ is selected from hydrogen; formyl groups: alkyl groups: and alkyl groups having at least one hydroxyl, carboxylic acid, ester or salt, aldehyde or ketone groups.

5. The process of claim 4 wherein at least one of $R^2$ is a hydroxyalkyl group.

6. The process of claim 3 wherein the compounds are ethylenediaminemonoacetic acid (EDMA), ethylenediaminediacetic acid (EDDA), ethylenediaminetriacetic acid (ED3A) or mixtures thereof.

7. The process of claim 6 wherein at least one compound is ethylenediaminediacetic acid (EDDA).

8. The process of claim 1 wherein each liter of the absorbent solution absorbs at least about 0.05 moles of $SO_2$.

9. The process of claim 8 wherein each liter of the absorbent solution absorbs at least about 0.5 moles of $SO_2$.

10. The process of claim 1 wherein the aqueous solution contains a concentration of the absorbent compound of at least 0.1 weight percent.

11. The process of claim 1 wherein the absorption of $SO_2$ from the fluid is conducted at a temperature of from 0° C. to about 120° C.

12. The process of claim 11 wherein the absorption of $SO_2$ from the fluid is conducted at a temperature of from 5° C. to about 60° C.

13. The process of claim 1 wherein, after absorption of $SO_2$ by the admixture, $SO_2$ is removed in at least one regenerating step by heating the admixture to a temperature of from about 75° C. to about 150° C.

14. The process of claim 13 wherein the temperature is from about 90° C. to about 120° C.

15. The process of claim 1 wherein the absorbent has a regenerability of at least about 30 percent.

16. The process of claim 15 wherein the absorbent has a regenerability of at least about 50 percent.

17. The process of claim 13 wherein during the regeneration step, a compound of Formula II:

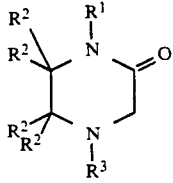

Formula II wherein each $R^1$, $R^2$ or $R^3$ is independently hydrogen; an alkyl group; a carboxylic acid group; a hydroxyalkyl group; an aldehyde group; an alkyl group containing a carboxylic ester, a carboxylic acid or salt, ether, aldehyde, ketone or sulfoxide group is formed from at least one compound of Formula I.

18. The process of claim 17 wherein the regeneration step takes place at a pH of about 5.0 or less.

19. The process of claim 18 wherein the regeneration step process takes place at a pH of less than about 2.0.

20. The process of claim 17 wherein the regeneration takes place in the presence of $SO_2$.

21. The process of claim 20 wherein there is sufficient $SO_2$ to maintain a pH of about 5 or less.

22. The process of claim 18 wherein after formation of at least one compound of Formula II, there is additional absorption of $SO_2$ by an aqueous solution of the compound of Formula II, and subsequent removal of $SO_2$ from the solution by heating the solution to a temperature of from 75° C. to about 150° C.

23. The process of claim 1 wherein each carboxylic acid and carboxymethyl group is in the form of the acid or its alkali metal salt.

24. The process of claim 3 wherein each carboxylic acid and carboxymethyl group is in the form of the acid or its alkali metal salt.

25. The process of claim 5 wherein each carboxylic acid and carboxymethyl group is in the form of the acid or its alkali metal salt.

26. The process of claim 1 wherein the fluid is a gas.

27. The process of claim 1 wherein the absorbent for the $SO_2$ consists essentially of an admixture of water and at least one compound represented by Formula I:

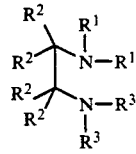

Formula I wherein each $R^1$, $R^2$ or $R^3$ is independently hydrogen; an alkyl group; a carboxylic acid group; a hydroxyalkyl group; an aldehyde group; an alkyl group containing a carboxylic ester, a carboxylic acid or salt, ether, aldehyde, ketone or sulfoxide group; wherein at least one $R^1$ or $R^3$ is carboxymethyl group ($-CR^2{}_2-COOH$ or $-CR^2{}_2-COO^-X^+$, that is acid or salt) and at least one $R^1$ or $R^3$ is hydrogen.

* * * * *